US010211617B2

(12) United States Patent
Buche et al.

(10) Patent No.: US 10,211,617 B2
(45) Date of Patent: Feb. 19, 2019

(54) PHASE CONDUCTOR ARRANGEMENT

(71) Applicant: SIEMENS AKTIENGESELLSCHAFT, Munich (DE)

(72) Inventors: Daniel Buche, Berlin (DE); Patrick Schlieder, Schoenwalde-Glien (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/748,078

(22) PCT Filed: Jun. 27, 2016

(86) PCT No.: PCT/EP2016/064772
§ 371 (c)(1),
(2) Date: Jan. 26, 2018

(87) PCT Pub. No.: WO2017/016771
PCT Pub. Date: Feb. 2, 2017

(65) Prior Publication Data
US 2018/0219366 A1  Aug. 2, 2018

(30) Foreign Application Priority Data
Jul. 27, 2015  (DE) .......................... 10 2015 214 126

(51) Int. Cl.
*H02G 5/10* (2006.01)
*H01R 4/56* (2006.01)
*H01R 4/60* (2006.01)
*H02G 5/06* (2006.01)
*H01R 25/14* (2006.01)

(52) U.S. Cl.
CPC ................. *H02G 5/10* (2013.01); *H01R 4/56* (2013.01); *H01R 4/60* (2013.01); *H01R 25/145* (2013.01); *H02G 5/063* (2013.01); *H02G 5/065* (2013.01)

(58) Field of Classification Search
CPC . H02G 5/10; H02G 5/063; H01R 4/56; H01R 4/60; H01R 25/145
USPC ...................................................... 174/70 B
See application file for complete search history.

(56) References Cited

U.S. PATENT DOCUMENTS

| | | | | |
|---|---|---|---|---|
| 2,057,266 | A | * | 10/1936 | Rippere ................. H02G 5/025 174/24 |
| 2,964,586 | A | * | 12/1960 | Sillman .................... H02G 5/06 174/129 B |
| 3,515,939 | A | | 6/1970 | Trump |
| 3,712,953 | A | | 1/1973 | Boersma et al. |
| 3,823,248 | A | | 7/1974 | Christie et al. |

(Continued)

FOREIGN PATENT DOCUMENTS

| DE | 1665349 A1 | 3/1971 |
|---|---|---|
| DE | 2016957 A1 | 8/1971 |

(Continued)

*Primary Examiner* — Michael F McAllister
(74) *Attorney, Agent, or Firm* — Laurence Greenberg Werner Stemer; Ralph Locher

(57) ABSTRACT

A phase conductor arrangement for an electricity transmission device has an electroconductive main member. The electroconductive main member extends along a main axis. A substantially slit-shaped opening extends along the main member. The main member is a hollow cylinder, and the opening extends along an outer wall of the hollow cylinder. The outer wall opposite the opening is closed.

14 Claims, 5 Drawing Sheets

(56) References Cited

U.S. PATENT DOCUMENTS

| | | | | |
|---|---|---|---|---|
| 5,275,292 | A * | 1/1994 | Brugger | B03C 1/253 |
| | | | | 209/212 |
| 7,740,497 | B2 * | 6/2010 | Nightingale | H01L 31/02008 |
| | | | | 439/215 |
| 2009/0000817 | A1 | 1/2009 | Granhaug et al. | |
| 2011/0177381 | A1 * | 7/2011 | Oya | H01M 2/202 |
| | | | | 429/158 |
| 2011/0284264 | A1 | 11/2011 | Kim et al. | |
| 2015/0116063 | A1 * | 4/2015 | Liu | H01F 27/2847 |
| | | | | 335/299 |

FOREIGN PATENT DOCUMENTS

| | | |
|---|---|---|
| DE | 2363819 A1 | 6/1975 |
| DE | 3103433 A1 | 11/1982 |
| DE | 102008049435 A1 | 4/2010 |
| DE | 102009025566 A1 | 12/2010 |
| EP | 1473800 A1 | 11/2004 |
| EP | 2410626 A1 | 1/2012 |
| JP | H0550913 U | 7/1993 |
| WO | 2007085424 A1 | 8/2007 |

\* cited by examiner

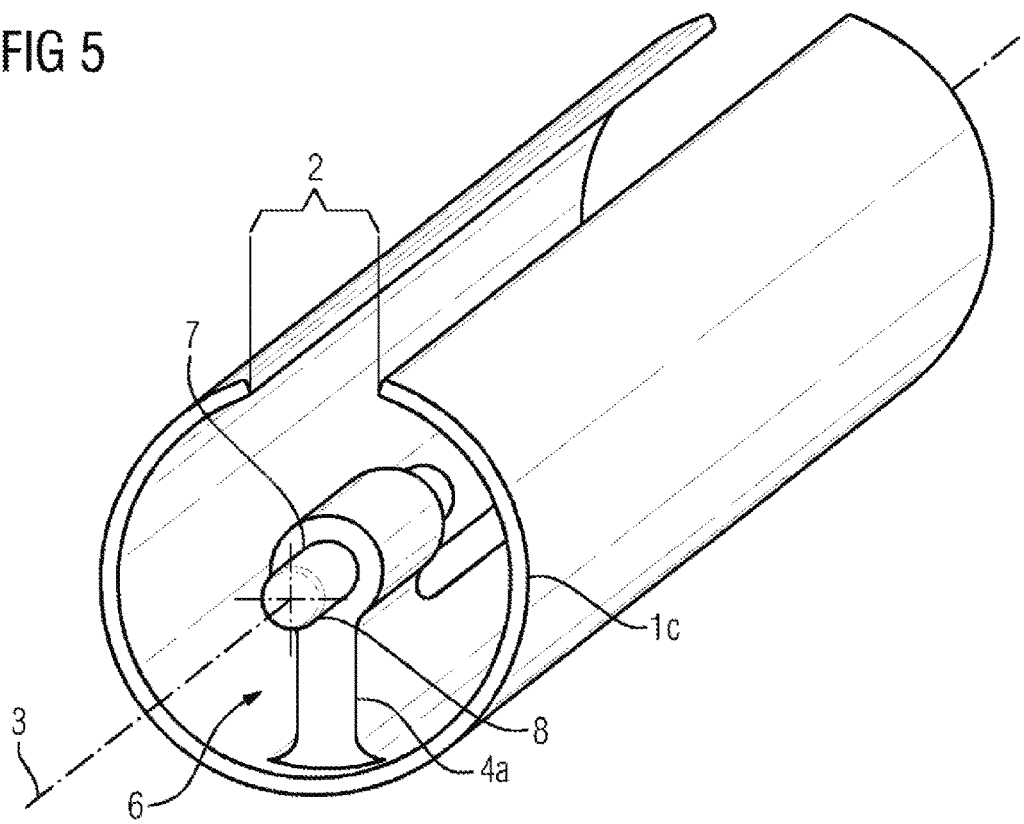
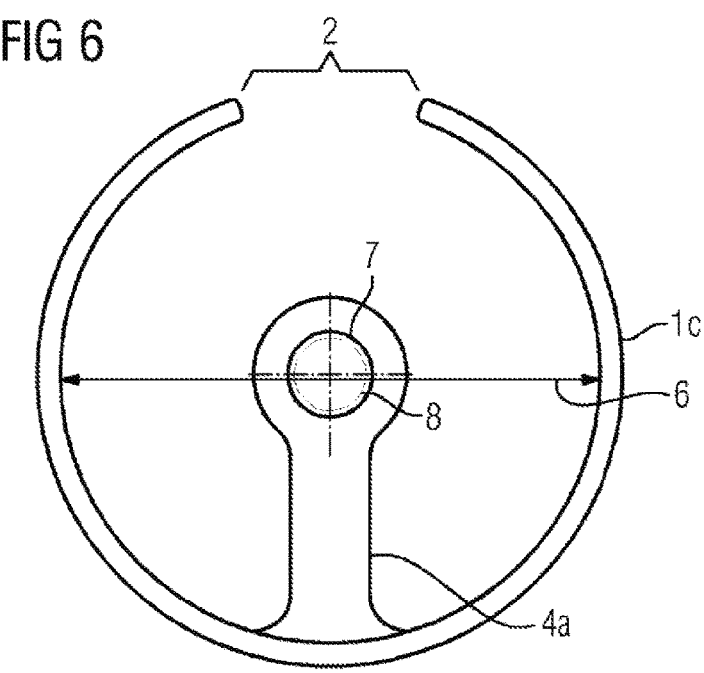

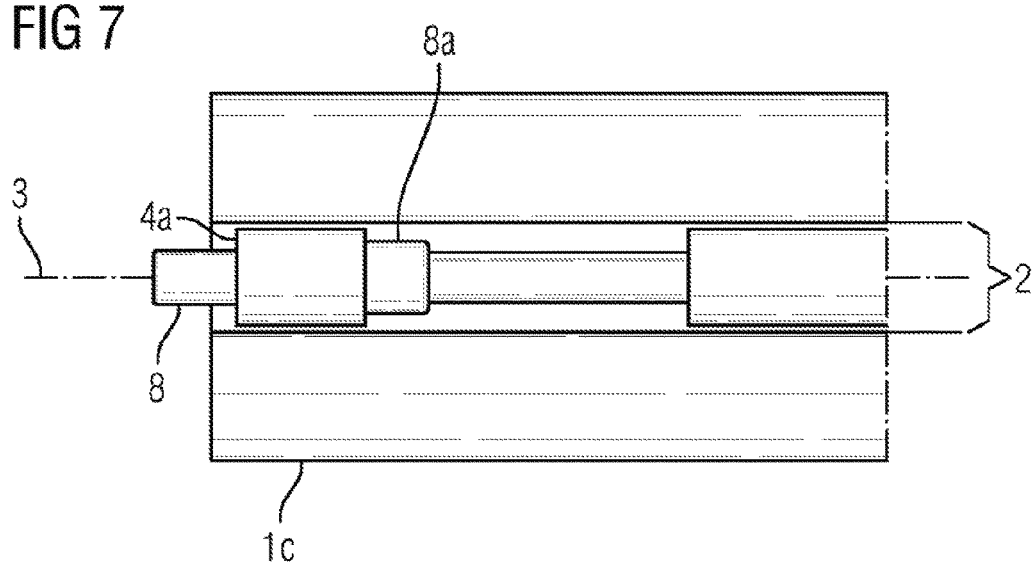

PHASE CONDUCTOR ARRANGEMENT

BACKGROUND OF THE INVENTION

Field of the Invention

The invention relates to a phase conductor arrangement for an electrical energy transmission device comprising an electrically conductive base body, which extends along a main axis, and also a cut-out that is essentially strip-shaped and extends along the base body.

A phase conductor arrangement of this type is known by way of example from the Japanese utility model JP 5-50913 U. Said document describes a phase conductor arrangement that comprises an electrically conductive base body, wherein the electrically conductive base body extends along a main axis. The base body is provided with cut-outs with the result that on the one hand a stable mechanical structure is produced and on the other hand it is possible for a fluid to flow through the phase conductor arrangement in a favorable manner.

An embodiment of this type renders it possible for a fluid to flow in and out and consequently to cool the electrically conductive base body that is provided therein. However, a phase conductor arrangement of this type has proven to be cost-intensive to produce. It is necessary to provide multiple cut-outs, which may involve different manufacturing processes. All these manufacturing processes do however have in common that the manufacturing outlay is increased as a result of having to provide the cut-outs.

It follows from this that the object of the invention is to provide a phase conductor arrangement that on the one hand renders it possible to dissipate heat in an efficient manner and on the other hand renders it possible to use cost-effective manufacturing processes for producing the phase conductor arrangement.

SUMMARY OF THE INVENTION

In accordance with the invention, the object is achieved in the case of a phase conductor arrangement of the type mentioned in the introduction by virtue of the fact that the base body is a hollow cylinder that comprises the cut-out in a peripheral wall, wherein the peripheral wall that lies opposite the cut-out is closed.

A hollow cylinder extends along a hollow cylinder axis (main axis), wherein a hollow cylinder comprises a peripheral wall that surrounds a hollow cylinder cut-out. The hollow cylinder axis can deviate from a true linear progression with the result that curved progressions are also possible. Hollow cylinders may comprise the most varied cross-sections. It is preferred that the hollow cylinder should have an annular cross-section.

It is possible by virtue of using a strip-shaped cut-out to form cut-outs that have a large cross-section and may extend in the base body essentially parallel with the hollow cylinder axis or main axis. The peripheral wall that lies opposite the cut-out in a transverse manner with respect to the main axis should be closed, i.e. not provided with a cut-out. It is possible by virtue of arranging a closed peripheral wall opposite the cut-out to promote convection in the interior of the phase conductor arrangement. A rapid through-flow of fluid media through the phase conductor arrangement is prevented by blocking a direct flow path in a transverse manner with respect to the hollow cylinder axis. Heat can be dissipated in a purposeful manner from the interior of the phase conductor arrangement. An inward flow of heat from the peripheral-side directions into the base body is restricted. The cross-section of the phase conductor arrangement is only slightly reduced. Despite an enlarged cross-section of the cut-out of the cross-section, the cross-section (end face) of the base body that remains for carrying an electrical current is only slightly reduced, particularly in the case of a strip-shaped extension that is oriented parallel with the main axis. The cut-out may lie in particular diametrically opposite the peripheral wall. Moreover, the mechanical robustness of the base body is improved by virtue of omitting an opposite-lying cut-out. In addition, the base body may by way of example be used to receive further elements. By way of example, the base body may capture abraded particles or the like in its interior, with the result that the abraded particles are retained in a shielded manner in a type of particle trap in the phase conductor arrangement. As a consequence, it is possible to prevent a dielectric that is surrounding the base body from being adversely affected by undefined particle collections. However, it is also possible to provide that it is possible to access the interior of the base body via the cut-out, with the result that it is also possible to accommodate therein further elements, such as by way of example sensors or the like. This has the advantage that on the one hand the elements that are arranged in the interior of the base body are mechanically protected, on the other hand, as a result of its electrically conductive characteristics, the phase conductor arrangement functions also as a Faraday cage with the result that a field-free space is provided. In particular sensors are thus mechanically protected and dielectrically shielded.

A further embodiment may provide that the cut-out extends continuously along the base body.

A continuous cut-out may extend along the main axis with the result that the cut-out extends along the base body preferably over the entire length of said base body. As a consequence, it is possible to use simplified production methods so as to arrange the cut-out in the base body. It is possible in a particularly efficient manner to produce the base body by way of example using an extrusion process. The cut-out may be formed in a flush manner, i.e. extending parallel with the main axis and formed as one during the extrusion process. However, it is also possible to provide that the cut-out is arranged in a coaxial manner with respect to the main axis. This provides by way of example the possibility of arranging the cut-out in a type of wave shape or screw shape in the hollow cylinder.

A further advantageous embodiment may provide that a groove that is accessible via the cut-out is formed in the hollow cylinder.

A groove comprises a surface that is essentially curved in a concave manner with the result that by way of example fluids or easily-dispersible particles can collect under the force of gravity in the groove. This has the advantage that media collect by way of example within the phase conductor arrangement or said media are guided within the phase conductor arrangement. By virtue of providing a cut-out in a peripheral wall of the hollow cylinder, it is possible to form the groove by way of example at least in part along an inner peripheral face of the base body.

It is possible to provide in an advantageous manner that in a transverse manner with respect to the main direction the cut-out comprises a smaller extension than the groove.

As a result of the fact that the cut-out extends in a transverse manner with respect to the main direction to a lesser extent than the groove, the edges of the groove are configured with an undercut with the result that the groove forms a stable dielectrically shielded region. The edges of the groove dielectrically shield the groove.

A further advantageous embodiment may provide that the peripheral wall comprises at least on the inner peripheral face a profiled structure that increases the surface area.

A profiled structure renders it possible to increase the surface area of the peripheral wall in particular on the inner peripheral face. As a consequence, the tendency to dissipate thermal energy out of the phase conductor arrangement is promoted. In addition to providing a positive influence on the manner in which heat is dissipated at the phase conductor arrangement, the profiled structure can also be used for the purpose of creating regions that are dielectrically shielded in a particularly reliable manner. It is thus possible, by way of example, for radially oriented grooves to extend on the inner peripheral face along the main axis, as a consequence of which webs that protrude within the phase conductor arrangement are formed. Webs of this type may also be used so as to connect further assemblies to the phase conductor arrangement. It is possible particularly when using further elements that are to be positioned within the phase conductor arrangement to arrange by way of example retaining sites on the webs so as to support the further elements or assemblies against the phase conductor arrangement.

A further advantageous embodiment may provide that the base body is an angle-rigid body.

It is advantageous to configure the base body as an angle-rigid body so as to provide a support of said base body in a simple form. It is thus possible to use the intrinsic stability of the base body and to support this merely at selected sites. The base body may be used accordingly so as to retain and position further components. The above mentioned further elements can be supported for their part against the base body. It is thus possible for temperatures or other variables relating to the states of the phase conductor arrangement or to the states of the fluid that is surrounding the phase conductor arrangement to be detected directly in the proximity of the phase conductor arrangement.

Furthermore, it is advantageously provided that the base body comprises an end-face side contacting surface that corresponds essentially to an annular segment.

It is possible to provide an annular segment on a hollow cylindrical base body, wherein it is possible by means of providing a cut-out in the peripheral wall to open up an end-face annulus to form an annular segment.

An end face of the base body may be used to provide the electrical contact with a further element, by way of example a further base body or a closure assembly etc. with the result that electrical contact with the base body is preferably achieved via at least one of its end faces. The annular segment differs from a true annular shape. By way of example, it is possible by means of providing the peripheral surfaces with a profiled structure, in particular an inner peripheral surface of the base body, to provide the annular segment with corresponding protrusions, such as for example webs. However, it is also possible to provide that by way of example a compressed or extended annular segment is used with the result that an elliptical shape is formed that differs from a true circular path. Moreover, the strength of the peripheral wall of the annular segment may vary with the result that by way of example crescent-shaped contacting surfaces may be formed.

A further advantageous embodiment may provide that a tensioning device is arranged distributed in the end face.

Since a tensioning device is distributed in the end face, this has the advantage that forces are introduced in a distributed manner into the contacting surface, with the result that a low-resistance transition is provided from the base body to a further electrically conductive contacting element (for example a further base body or an assembly body). By way of example, it is possible to provide studs, screws, rivets, clamps, threaded bore holes etc. as the tensioning device.

A further advantageous embodiment may provide that a central tensioning device is arranged in the end face of the base body.

It is possible by using a central tensioning device to simplify the procedure of assembling a base body since it is possible to use a central tensioning device to provide a tensioning arrangement.

It is possible in an advantageous manner to provide that the central tensioning device is arranged on a web that is encompassed by the base body.

A web that is encompassed by the base body may be formed by way of example by means of providing the inner peripheral surface of the peripheral wall of the base body with a profiled structure. By way of example, it is possible when the tensioning device is arranged in a central manner for the web to be connected to the base body starting in the radial direction from said tensioning device with the result that tensioning forces may be transmitted to the base body via the web. The central tensioning device may itself be part of a flow path. However, it is also possible to provide that the central tensioning device is only used to tension an end face of the base body.

It is advantageously provided that the web lies diametrically opposite the cut-out.

By virtue of arranging the web diametrically opposite the cut-out, it is possible to access the web via the cut-out and where necessary also to adapt said web. In addition to providing a simplified access, it is also advantageously possible to use a web that is positioned in this manner as a cooling rib since said web is able to provide additional support for the dissipation of heat from the interior of the base body. By virtue of said web being arranged diametrically opposite the cut-out, the flow in the interior of the base body is only insignificantly impaired with the result that it is furthermore possible to dissipate thermal energy in a simplified manner from the interior of the base body via the cut-out. Moreover, the web may be used to dielectrically shield the cut-out.

A further advantageous embodiment may provide that the cut-out is delimited by the free end of the annular segment.

The free ends of the annular segments can be by way of example the free ends of edges of a groove that follow the groove. The free ends delimit the cut-out in a transverse manner with respect to the main axis with the result that the azimuthal extension of the cut-out is delimited whereas the axial extension of the cut-out is not delimited by the free ends of the annular segment.

A further advantageous embodiment may provide that the cut-out extends essentially parallel with the main axis.

The fact that the cut-out extends parallel with the main axis renders it possible for the cut-out by way of example in the assembled state to come to rest with respect to a vertical in the upper region of the phase conductor arrangement. The main axis may preferably lie essentially in a horizontal manner. As a consequence, the cut-out provides additional support for the dissipation of thermal energy. As a result of its parallel extension with the main axis, the cut-out has the same orientation as the main axis, wherein the cut-out extends in a preferred aligned manner with respect to the main axis along the base body.

A further advantageous embodiment may provide that an electrical energy transmission device that is insulated by means of a pressurized fluid comprises a phase conductor arrangement according to one of the above mentioned embodiments.

An electrical energy transmission device that is insulated by means of a pressurized fluid comprises as an electrically insulating medium a fluid that is pressurized. The electrical energy transmission device is equipped for this purpose with a pressure vessel so as to retain the electrically insulating fluid and to pressurize said fluid.

The phase conductor is arranged within the pressure vessel, wherein said phase conductor is generally held in an electrically insulating manner with respect to the pressure vessel or the pressure vessel itself provides the electrical insulation. Suitable fluids are preferably gases or also liquids, wherein the preferred gases are sulphur hexafluoride, nitrogen, carbon dioxide, fluids that contain fluorinated ketone, in particular gases, or fluids that contain fluorinated nitrile, in particular gases. The electrically insulating fluid flows around the phase conductor/the base body and through said base body. In addition to providing the electrical insulation, the fluid is also used to dissipate heat. It is also possible to use the arrangement in accordance with the invention in an electrical energy transmission device that comprises single phase or multi-phase insulation. In the case of a multi-phase insulation, the same fluid flows around multiple base bodies of multiple phases of an electrical energy transmission system. In the case of a single phase insulation, separate fluids are used to insulate multiple base bodies of different phases of an electrical energy transmission system from one another.

In the following, an exemplary embodiment of the invention is illustrated schematically in a drawing and further described below. In the drawing:

BRIEF DESCRIPTION OF THE SEVERAL VIEWS OF THE DRAWING

FIG. 5 illustrates a perspective view of a phase conductor arrangement in a third embodiment variant, FIG. 6 illustrates an end-face view of the phase conductor arrangement shown in FIG. 5, FIG. 7 illustrates a plan view of the phase conductor arrangement shown in FIG. 5.

DESCRIPTION OF THE INVENTION

The embodiment variants illustrated in FIGS. 1 to 9 comprise in each case fundamentally the same construction, in which a base body is configured as a hollow cylinder that comprises a cut-out in a peripheral wall, wherein the peripheral wall is closed on a side that lies diametrically opposite the cut-out.

In the following, it is intended to describe the fundamental construction of a phase conductor arrangement with reference to FIG. 1, wherein the statements apply mutatis mutandis to the other embodiment variants two to four. Reference is made to the other embodiment variants two to four with regard to deviations in respect to FIGS. 1 and 2 in which a first embodiment variant of a phase conductor arrangement is illustrated.

Figure 1:
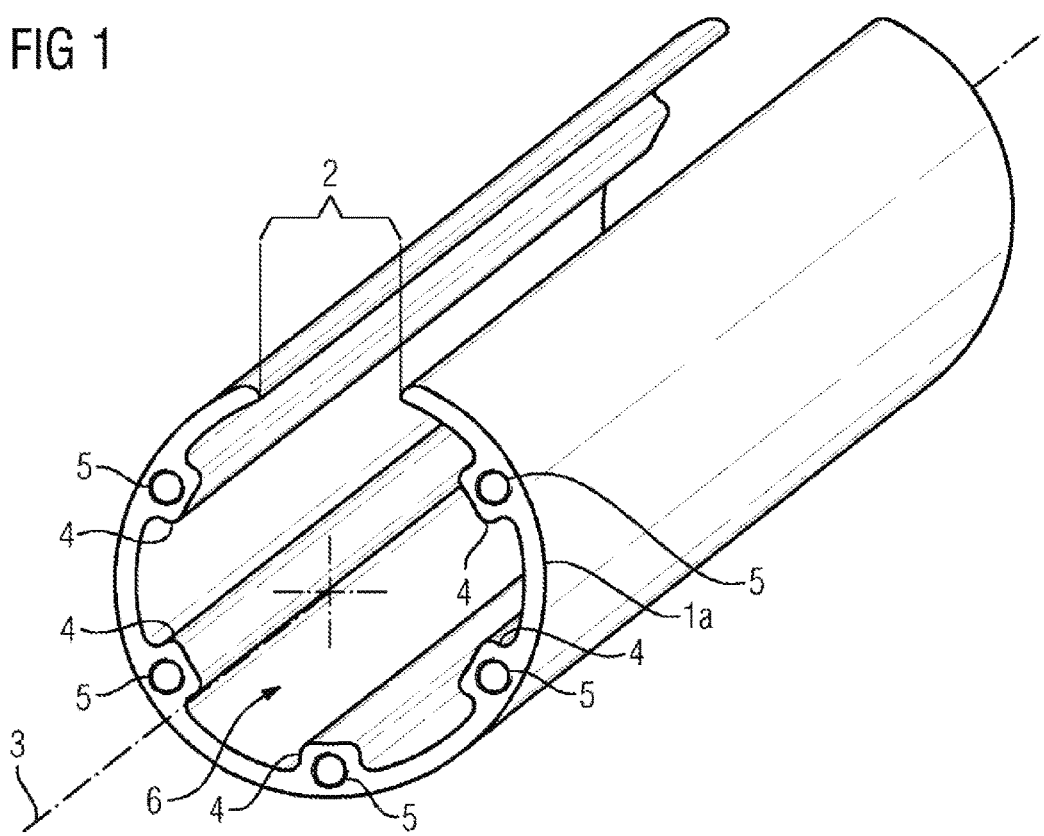
FIG. 1 illustrates a perspective view of a phase conductor arrangement in a first embodiment variant.

FIG. 1 illustrates a perspective view of a phase conductor arrangement 1a in a first embodiment variant. The phase conductor arrangement 1a in a first embodiment variant comprises a hollow cylindrical base body that comprises a cut-out 2 in a peripheral wall. The base body of the phase conductor arrangement 1a of the first embodiment variant is oriented in a coaxial manner with respect to the main axis 3. The cut-out 2 extends along the main axis 3 over the entire axial extension of the main body, wherein the cut-out 2 is configured essentially in a strip-shaped manner and extends parallel with the main axis 3. In addition to a parallel extension, it is also possible to provide a coaxial extension, by way of example in a screw shape or wave shape. Since the cut-out 2 extends along the entire length of the base body, the cut-out 2 is not delimited at the end face, in other words is not delimited in the end faces of the phase conductor arrangement 1a in a first embodiment variant by means of the base body of the phase conductor arrangement 1a in the first embodiment variant itself. The cut-out 2 is delimited in a transverse manner with respect to the main axis 3 by the free ends of the peripheral wall that extend in a linear manner and are oriented parallel with one another and also parallel with the main axis 3. The cut-out 2 opens up an essentially annular cross-section to form a cross-section that has essentially the shape of an annular segment.

The phase conductor arrangement 1a in a first embodiment variant is embodied from an electrically conductive material, by way of example an aluminum alloy or a copper alloy. The peripheral surface of the base body is curved in a convex manner on the outer peripheral face, since the outer sleeve contour of the base body corresponds to a circle. Webs 4 extend along the circular cylindrical inner peripheral surface on the inner peripheral face. The webs 4 protrude out of a circular cylindrical inner peripheral face of the base body and protrude radially inward in the direction of the main axis 3. The webs 4 extend parallel with one another and also parallel with the main axis 3. The webs 4 extend in a linear manner. The webs 4 extend in the identical axial manner as the cut-out 2. The webs 4 may however also extend in different progressions. The webs 4 may extend by way of example also in a screw-shape manner or a wave-shape manner. In an advantageous manner, the cut-out 2 and the webs 4 extend in a similar or identical manner. Furthermore, the webs 4 are also arranged parallel with the body edges of the phase conductor arrangement 1a in a first embodiment variant and this delimits the cut-out 2 in a transverse direction with respect to the main axis 3. Threaded bore holes 5 are provided in the webs 4 at the end face. The threaded bore holes 5 act as a tensioning device. It is possible via the threaded bore holes 5 to screw a further element to the phase conductor arrangement 1a in a first embodiment variant or to the base body thereof. By way of example, an assembly body that closes off the base body may be connected at the end face to the base body of the phase conductor arrangement 1a in a first embodiment variant. The end face of the base body is configured as an electrically conductive contacting surface with the result that it is possible to make electrical contact with the phase conductor arrangement 1a in a first embodiment variant via an end face. The threaded bore holes 5 are distributed in an end face of the phase conductor arrangement 1a in the first embodiment variant and issue within the end surface of the base body of the phase conductor arrangement 1a in a first embodiment variant, said end surface being provided for making electrical contact. As a consequence, it is possible to introduce forces in a tension-free manner and over the surface area into the base body of the phase conductor arrangement 1a in a first embodiment variant. It is advantageously possible to produce a base body of this type for a phase conductor arrangement 1a in a first embodiment variant, by way of example in an extrusion process. It is thus possible to produce a phase conductor arrangement using a semi-finished product. A phase conductor arrangement may be configured with a specific structure or length as required by means of cutting off a piece from the semi-finished product. Cut-outs for the threaded bore holes 5 can likewise be provided along the length during an extrusion process with the result that it is only necessary to provide a thread after the piece has been cut to length. It is however also possible to provide that the threaded bore holes 5 are provided in the base body retrospectively.

FIG. 1 illustrates the phase conductor arrangement 1a in a first embodiment variant in an installed position in which the cut-out 2 is positioned with respect to a perpendicular line at an upper end of the phase conductor arrangement 1a in a first embodiment variant. The main axis 3 is arranged essentially in a horizontal manner. It is thus possible in a simplified manner to dissipate heat from the interior of the phase conductor arrangement 1a in a first embodiment variant or also to capture or collect particles in the interior of the phase conductor arrangement 1a and to use the phase conductor arrangement 1a as a particle trap.

Figure 2:
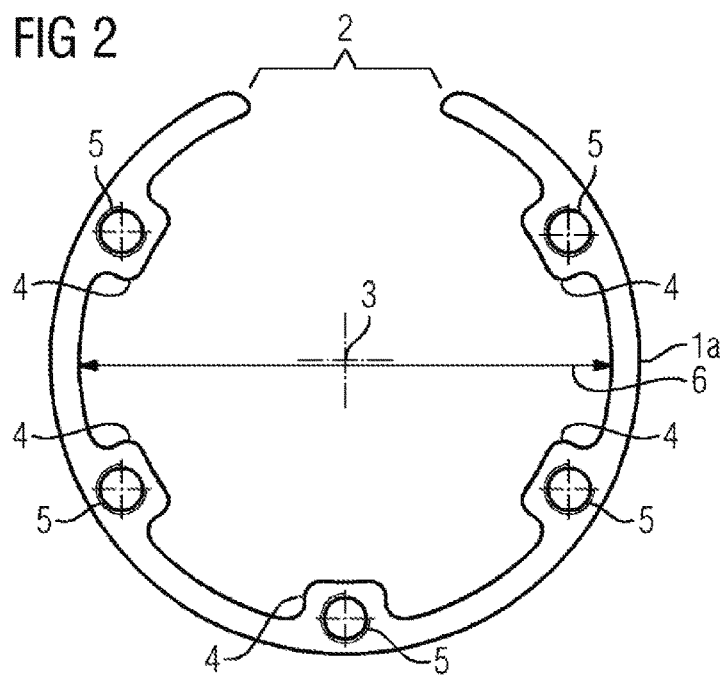
FIG. 2 illustrates an end-face view of the phase conductor arrangement shown in FIG. 1.

FIG. 2 illustrates an end face view of the phase conductor arrangement 1a in a first embodiment variant as is known from FIG. 1.

Figure 3:
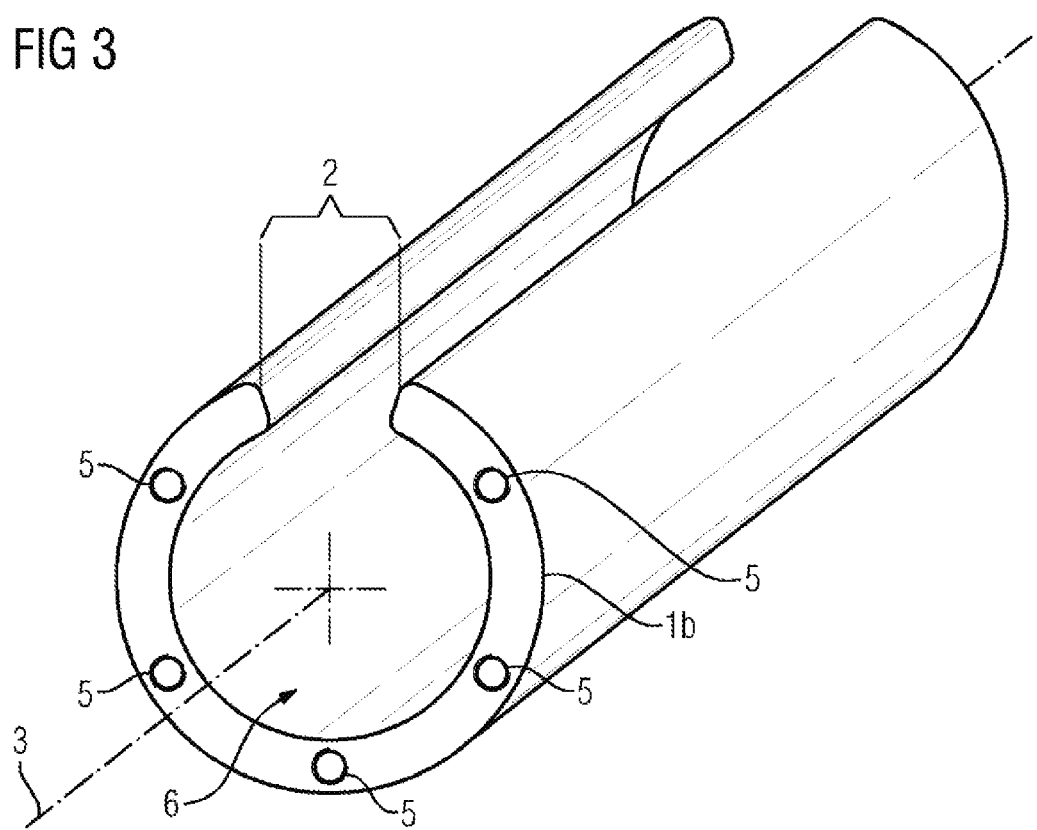
FIG. 3 illustrates a perspective view of a phase conductor arrangement in a second embodiment variant.
Figure 4:
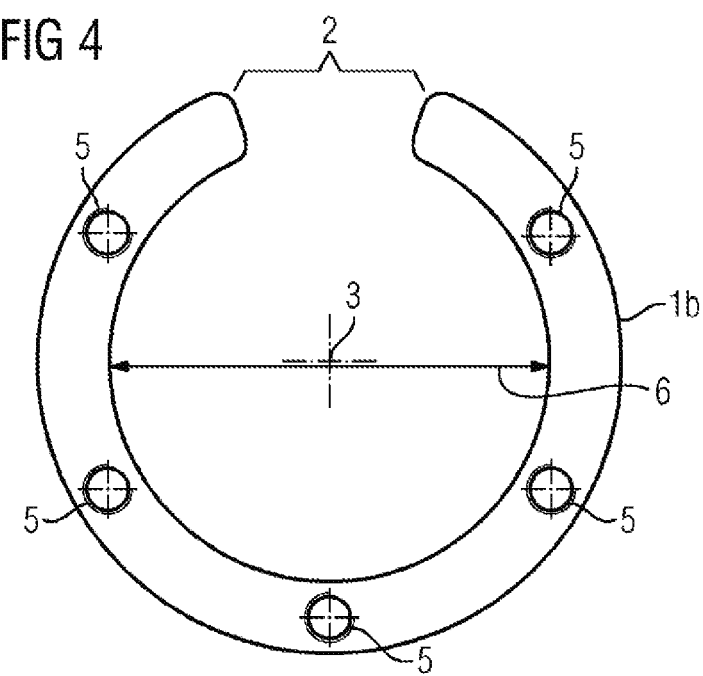
FIG. 4 illustrates an end-face view of the phase conductor arrangement shown in FIG. 3.

FIGS. 3 and 4 illustrate a perspective view or an end face view of a phase conductor arrangement 1b in a second embodiment variant. The statements relating to the phase conductor arrangement 1a in a first embodiment variant apply mutatis mutandis to the phase conductor arrangement 1b in a second embodiment variant. The same applies for the phase conductor arrangements 1c, 1d in a third and fourth embodiment variant. The cross-section in the case of the phase conductor arrangement 1b in the second embodiment variant has been varied. The cross-section of the phase conductor arrangement 1b in a second embodiment variant has been enlarged in comparison to the phase conductor arrangement 1a in a first embodiment variant. It could be possible to omit an additional arrangement of webs 4 on the inner peripheral face in the case of the phase conductor arrangement 1b in a second embodiment variant. The threaded bore holes 5 are provided directly in an annular-shaped end face of the phase conductor arrangement 1b in a second embodiment variant. A cut-out 2 is also provided along the length of the peripheral wall, wherein the cut-out 2 provides access to a groove 6 (similar to FIGS. 1 and 2) that comprises a dielectrically shielded region. It is possible by way of example for particles to collect in the groove 6 or to install further assemblies in said groove. It is thus possible by way of example to arrange sensors within the groove 6 by way of example. The phase conductor arrangement 1a in a first embodiment variant also comprises a groove 6, wherein a profiled structure of the groove 6 is provided by means of the webs 4.

FIGS. 5, 6, 7, 8 and 9 illustrate phase conductor arrangements 1c, 1d in a third and a fourth embodiment variant. In lieu of using and arranging tensioning devices of the phase conductor arrangements 1a, 1b of the first and second embodiment variant, a central arrangement of the tensioning device is hitherto provided.

FIG. 5 illustrates a perspective view of a phase conductor arrangement 1c in a third embodiment variant. The base body comprises in turn a hollow cylindrical base structure, wherein a cut-out 2 extends along the peripheral wall. The cut-out 2 has a similar dimension (with respect to the cross-section) to the cut-outs 2 of the first or second embodiment variants 1a, 1b of a phase conductor arrangement. This accordingly produces an annular segment for the end-face side contacting surface of the phase conductor arrangement 1c in the third embodiment variant. In order to connect the phase conductor arrangement 1c in a third embodiment variant to further components, by way of example base bodies or assembly bodies, a web 4a is cast into the inner peripheral face. The web 4a extends essentially in a radial manner with respect to the main axis 3 and protrudes into the main axis 3 with the result that the main axis 3 extends along the web 4a. The web 4a is positioned in such a manner that said web is oriented in a radial manner with respect to the main axis 3 and merges into the base body on an inner peripheral face of the base body of the phase conductor arrangement 1c in a third embodiment variant diametrically opposite the cut-out 2. As a consequence, it is possible to access the web 4a in a perpendicular manner via the cut-out 2. Such a perpendicular plan view is illustrated in FIG. 7. The web 4a divides a groove 6 of the phase conductor arrangement 1c in a third embodiment variant.

In order by way of example to provide a connection using a threaded stud, the web 4a is provided with a bore hole 7 (tensioning device) that is oriented in a coaxial manner with respect to the main axis 3. The bore hole 7 extends along the web 4a and issues at an end-face end of the web 4a. It is possible via the cut-out 2 to cut away parts of the web 4a or to remove the web 4a in part with the result that a further opening of the bore hole 7 is positioned on a face that is remote from the end-face outlet of the bore hole 7. It is possible to subsequently place in this bore hole 7 a threaded stud 8 that comprises a stud head 8a that comes to rest against the web 4a on the face that is remote from the end-face side opening of the bore hole 7 (cf. FIG. 7). The cut-out 2 renders it possible to use a tool to rotate the stud head 8a on the threaded stud 8.

It is apparent in the end face and perspective view of the phase conductor arrangement 1c in the third embodiment variant in FIG. 6 that the web 4a is arranged on the end-face end in an offset manner with respect to the plane of the contacting surface that is configured as an annular segment. As a consequence, it is ensured that during a tensioning procedure using the threaded stud 8a galvanic contact is preferably made via the annular contacting surface with the result that a low-resistance transition resistance may be produced between the base body of the phase conductor arrangement 1c in a third embodiment variant and the further element, by way of example an assembly body, which is to be connected to said base body.

Figure 8:
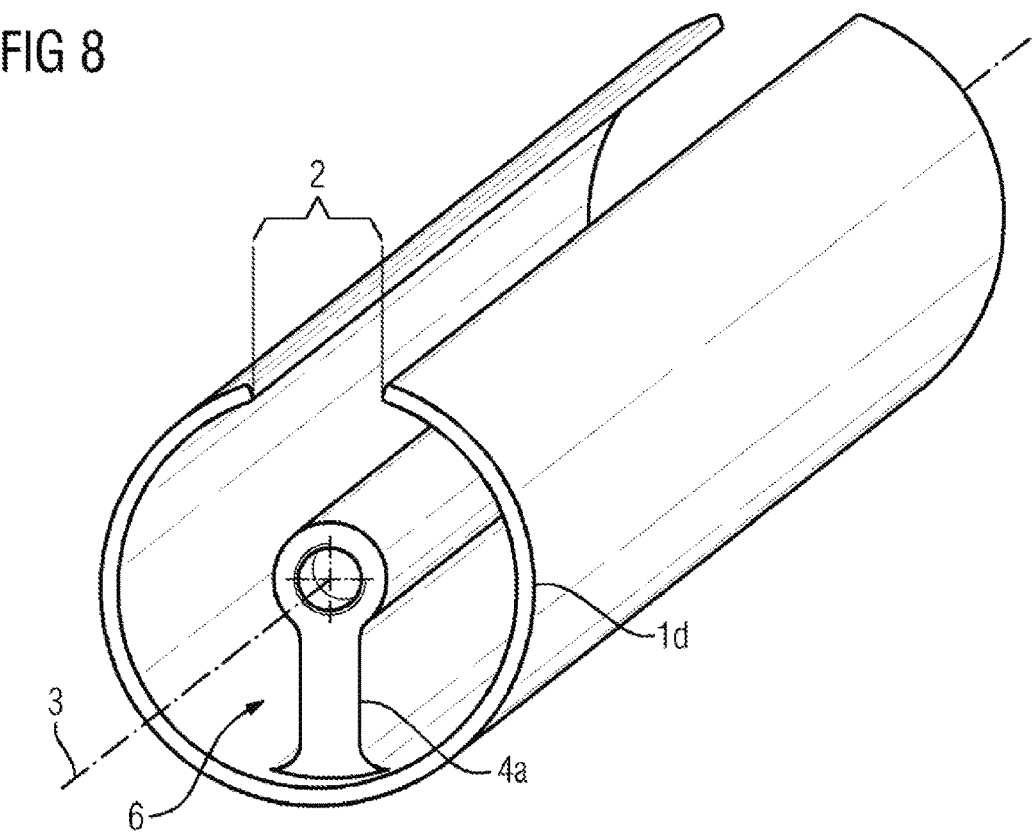
FIG. 8 illustrates a perspective view of a phase conductor arrangement in a fourth embodiment variant and FIG. 9 illustrates an end-face view of the phase conductor arrangement in accordance with FIG. 8.
Figure 9:
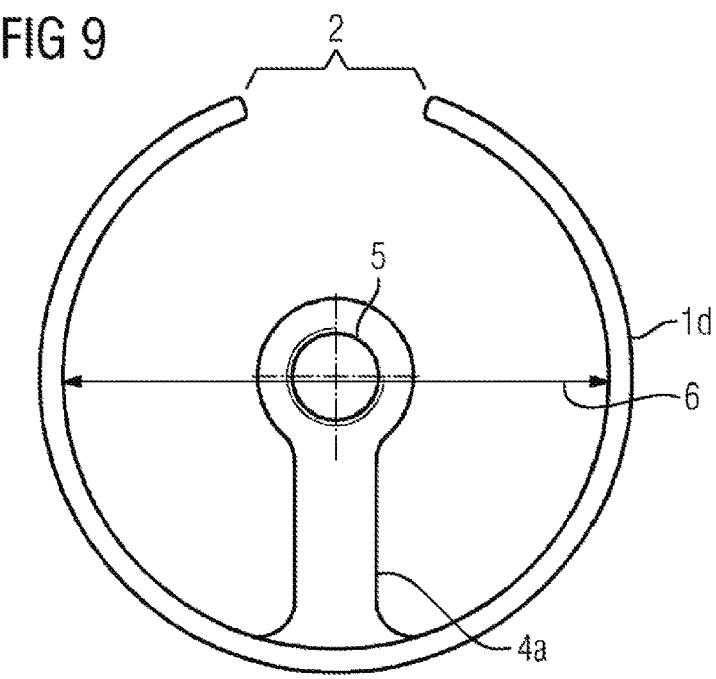

It is possible to tension the known phase conductor arrangement 1c in a third embodiment variant illustrated in FIGS. 5, 6 and 7 by way of example using a phase conductor arrangement 1d in a fourth embodiment variant (FIGS. 8, 9). It is possible to use the identical base body to produce the phase conductor arrangement 1d in a fourth embodiment variant, as is known in the case of the phase conductor arrangement 1c in a third embodiment variant as illustrated in FIGS. 5, 6 and 7. It is hitherto merely provided that the web 4a is provided with a threaded bore hole 5 that is oriented in a coaxial manner with respect to the main axis 3 with the result that it is possible by way of example to tension the phase conductor arrangement 1d in a fourth embodiment variant using a threaded stud 8, as is known from the phase conductor arrangement 1c in a third embodiment variant. In a similar manner to the embodiment of the phase conductor arrangement 1c in a third embodiment variant, the web 4a is offset with respect to the plane of the contacting surface with the result that the contacting surfaces contact one another and it is possible to produce a tensioning force between the phase conductor arrangements 1c, 1d in the third or fourth embodiment variant by means of tensioning the threaded stud 8 in the threaded bore hole 5.

In order to render it possible to arrange phase conductor arrangements in a modular manner in a line with one another, it is also possible to provide that in the case of a cylindrical structure of a phase conductor arrangement the end faces that are remote from one another are configured differently, preferably in a mirror-inverted manner, with the result that similarly constructed phase conductor arrangements may be coupled to one another. It is thus possible by way of example for the phase conductor arrangements 1c, 1d in a third and fourth embodiment variant illustrated in FIGS. 5, 6, 7 and 8 to be configured in each case on the end face with one of the two variants with the result that it is possible to arrange similar phase conductor arrangements in a modular manner and to couple said phase conductor arrangements to one another.

The same statements also apply for the embodiment of the phase conductor arrangements 1a, 1b in a first or second embodiment variant illustrated in FIGS. 1 and 2 or 3 and 4. It is also possible in this case for the end faces that are remote from the viewer in FIGS. 1 and 3 to be configured in a mirror-inverted manner with the result that by way of example threaded studs can be used to tension the threaded bore holes 5 in the end faces that are facing the viewer. It is subsequently possible for similarly constructed phase conductor arrangements to make contact with one another when arranged in a modular manner following one another in an almost continuous row and to connect said phase conductor arrangements in a mechanical and electrical manner.

The phase conductor arrangements 1a, 1b, 1c, 1d in the different embodiment variants that are illustrated in FIGS. 1, 2, 3, 4, 5, 6, 7, 8 and 9 comprise in each case a cut-out 2 which opens up a peripheral wall of a hollow cylindrical base body. Annuli that are opened up by the cut-out 2 to form an annular segment are suitable as a cross-section of the hollow cylinder. In addition, it is possible to arrange on the inner peripheral face or also on the outer peripheral face webs 4, 4a that provide the annular segment with a profiled structure in the cross-section. As an alternative or in addition thereto, notches or grooves may also be provided on the annular segment. In addition to a true circular embodiment of the annuli, it is also possible to use elliptical or oval hollow cylinders. It is also possible to use different random cross-sections as required.

It is possible via the cut-outs 2 of the different phase conductor arrangements 1a, 1b, 1c, 1d respectively to access a groove 6 that is encompassed by the remaining peripheral wall. Owing to the fact that the phase conductor arrangements 1a, 1b, 1c, 1d are configured in an electrically conductive manner, a dielectrically shielded space is formed within a phase conductor arrangement 1a, 1b, 1c, 1d and it is possible by way of example for foreign bodies, particles etc. to collect in said space with the result that it is not possible in a field-free space for said foreign bodies, particles etc. to cause malfunctions in the electrical fields outside the phase conductor arrangement 1a, 1b, 1c, 1d. Furthermore, it is possible by way of example to also install sensors or other elements in the groove 6 in order by way of example to monitor the phase conductor arrangement 1a, 1b, 1c, 1d or also an electrically insulating medium that is flowing around the phase conductor arrangement 1a, 1b, 1c, 1d. It is preferred that when the phase conductor arrangement 1a, 1b, 1c, 1d is in an installed position the cut-out is positioned with respect to a vertical line in the upper third of the phase conductor arrangement 1a, 1b, 1c, 1d with the result that on the one hand particles or assemblies can collect or be installed within the groove 6, on the other hand it is also possible for thermal energy to flow out from the interior of the phase conductor arrangement 1a, 1b, 1c, 1d via the cut-out 2. Furthermore, the groove 6 that is closed in the base region renders it possible for fluids, such as a condensed liquid or similar, within the respective phase conductor arrangement 1a, 1b, 1c, 1d to be discharged in the direction of the main axis 3. Access to the interior of the phase conductor arrangement 1a, 1b, 1c, 1d is provided via the cut-out 2. Webs 4, 4a that are provided within the phase conductor arrangement 1a, 1b, 1c, 1d may form a structure that increases the surface area with the result that additional support is provided to dissipate heat from the interior of the phase conductor arrangement 1a, 1b, 1c, 1d. It is preferred that the webs 4, 4a should extend in an aligned manner or parallel with the main axis 3.

The invention claimed is:

1. A phase conductor arrangement for an electrical energy transmission device, the phase conductor arrangement comprising:
   an electrically conductive base body being a hollow cylinder extending along a main axis;
   said hollow cylinder having a peripheral wall formed with a strip-shaped cut-out and a closed peripheral wall disposed opposite said cut-out; and
   said peripheral wall being formed with a profiled structure on an inner peripheral face thereof for increasing a surface area of said peripheral wall.

2. The phase conductor arrangement according to claim 1, wherein said cut-out extends continuously along said base body.

3. The phase conductor arrangement according to claim 1, wherein said hollow cylinder is formed with a groove that is accessible via said cut-out formed in said hollow cylinder.

4. The phase conductor arrangement according to claim 1, wherein said cut-out has a shorter extension than said groove in a direction transversely to the main direction.

5. The phase conductor arrangement according to claim 1, wherein said base body is an angle-rigid body.

6. The phase conductor arrangement according to claim 1, wherein said base body has an end-face side contacting surface being an annular segment.

7. The phase conductor arrangement according to claim 6, which comprises a tensioning device having elements distributed about an end face of said base body.

8. The phase conductor arrangement according to claim 1, which comprises a central tensioning device in an end face of said base body.

9. The phase conductor arrangement according to claim 8, wherein said central tensioning device is arranged on a web that is encompassed by said base body.

10. The phase conductor arrangement according to claim 9, wherein said web lies diametrically opposite said cut-out.

11. The phase conductor arrangement according to claim 6, wherein said cut-out is delimited by free ends of said annular segment.

12. The phase conductor arrangement according to claim 1, wherein said cut-out extends parallel with said main axis.

13. An electrical energy transmission device that is insulated by pressurized fluid, the electrical energy transmission device comprising a phase conductor arrangement according to claim 1.

14. The phase conductor arrangement according to claim 1, further comprising:
 a plurality of webs protruding out of a cylindrical inner peripheral face of said base and protruding radially inward in a direction of said main axis; and
 a tensioning device having elements distributed about an end face of said base body; and
 said base body having an end-face side contacting surface formed as an annular segment.

\* \* \* \* \*